United States Patent
El-Ella

(10) Patent No.: US 12,553,149 B2
(45) Date of Patent: Feb. 17, 2026

(54) METHOD AND SYSTEM FOR PROCESSING A DIAMOND

(71) Applicant: AdamanT Quanta AB, Malmö (SE)

(72) Inventor: Haitham El-Ella, Malmö (SE)

(73) Assignee: AdamanT Quanta AB, Malmö (SE)

( * ) Notice: Subject to any disclaimer, the term of this patent is extended or adjusted under 35 U.S.C. 154(b) by 0 days.

(21) Appl. No.: 18/868,249

(22) PCT Filed: May 23, 2023

(86) PCT No.: PCT/EP2023/063795
§ 371 (c)(1),
(2) Date: Nov. 22, 2024

(87) PCT Pub. No.: WO2023/227606
PCT Pub. Date: Nov. 30, 2023

(65) Prior Publication Data
US 2025/0257496 A1     Aug. 14, 2025

(30) Foreign Application Priority Data

May 23, 2022   (EP) .................................... 22174960

(51) Int. Cl.
*C30B 33/02* (2006.01)
*C30B 29/04* (2006.01)
(Continued)

(52) U.S. Cl.
CPC .............. *C30B 29/04* (2013.01); *C30B 33/02* (2013.01); *C30B 33/04* (2013.01); *H10F 30/289* (2025.01)

(58) Field of Classification Search
CPC ......... C30B 29/04; C30B 33/02; C30B 33/04; H01F 30/289
See application file for complete search history.

(56) References Cited

U.S. PATENT DOCUMENTS

| 8,932,554 B2 * | 1/2015 | Boudou ................. C09K 11/65 252/301.36 |
| 2011/0185964 A1 | 8/2011 | Shapiro |

(Continued)

FOREIGN PATENT DOCUMENTS

| EP | 1990313 A1 | 11/2008 |
| GB | 2492661 A | 1/2013 |
| WO | 2022004150 A1 | 1/2022 |

OTHER PUBLICATIONS

International Search Report & Written Opinion dated Jul. 19, 2023 pertaining to PCT International application No. PCT/EP2023/063795 filed May 23, 2023, pp. 1-19.

(Continued)

*Primary Examiner* — Robert M Kunemund
(74) *Attorney, Agent, or Firm* — Dinsmore & Shohl LLP

(57) ABSTRACT

A method of processing a diamond to obtain vacancy-based defects and vacancy-based clusters includes the steps of: providing an artificial single-crystal diamond with {001} faces, the artificial single-crystal diamond having a substitutional nitrogen concentration above or equal to 100 parts per million; conditioning surfaces of the diamond by boiling under reflux of a solution comprising nitric, sulphuric, and an oxidizing acid, such as perchloric acid or hydrogen chloride; irradiating the diamond with neutrons; conditioning the surfaces of the diamond at a temperature above or at least 100° C., under a constant gas flow with a pressure above or equal to atmosphere pressure, such as at least 1 bar; annealing the diamond, thereby obtaining a diamond with vacancy-based defects and vacancy-based clusters. A system for processing a diamond utilizes the method.

21 Claims, 4 Drawing Sheets

(51) Int. Cl.
*C30B 33/04* (2006.01)
*H10F 30/21* (2025.01)

(56) References Cited

U.S. PATENT DOCUMENTS

| | | |
|---|---|---|
| 2013/0337631 A1 | 12/2013 | Syue et al. |
| 2018/0068850 A1 | 3/2018 | Butler |
| 2018/0080145 A1 | 3/2018 | Munday et al. |
| 2019/0382919 A1 | 12/2019 | Bondokov et al. |
| 2020/0283927 A1 | 9/2020 | Sumiya et al. |

OTHER PUBLICATIONS

International Preliminary Report on Patentability dated Apr. 24, 2024 pertaining to PCT International application No. PCT/EP2023/063795 filed May 23, 2023, pp. 1-19.

* cited by examiner

METHOD AND SYSTEM FOR PROCESSING A DIAMOND

CROSS-REFERENCE TO RELATED APPLICATIONS

The present application is the National Phase entry of International Patent Application No. PCT/EP2023/063795, filed May 23, 2023, which claims priority to European Patent Application No. 22174960.9, filed May 23, 2022, the entire contents of both are hereby incorporated by reference into this application.

TECHNICAL FIELD

The present disclosure relates to a method for manufacturing a diamond with vacancy-based defects and vacancy-based clusters. The present disclosure further relates to a diamond manufactured with the presently disclosed method. The present disclosure further relates to a use of the presently disclosed diamond in an atomic clock. The disclosure further relates to a system for processing a diamond.

BACKGROUND

Naturally retrieved diamonds take many years to form and grow, usually in the order of millions of years. It is possible however to produce diamonds in a laboratory within a timeline of hours. Artificial or synthetic diamonds may be produced or grown in laboratories, for example, using a High Pressure High Temperature (HPHT) process, or by Chemical Vapour Deposition.

Diamonds, especially synthetic laboratory-grown diamonds, are widely used in many applications. Synthetic laboratory-grown diamonds are often composed of a similar crystalline composition to natural diamonds and they can be grown isotropically via an HPHT-type process.

Depending on the crystalline composition and depending on the way the crystalline composition of the diamond is manipulated, different properties of the diamond may be observed. Reversely, manipulation of a diamond to change and optimize the crystalline composition of the diamond, may result in the obtainment of a diamond targeted for specific applications.

SUMMARY

Recent studies have revealed that chemical, physical and optical properties of diamonds largely depend on the crystalline composition of the diamonds and the defects present in the crystalline structure. For example, diamonds may contain nitrogen atoms. Furthermore, diamonds may contain vacancies, that is missing atoms in the crystalline structure. Whenever a vacancy is adjacent to a nitrogen atom, a vacancy-based defect, such as a nitrogen-vacancy defect, is formed. Whenever two or more vacancies are adjacent to two or more nitrogen atom, a vacancy based cluster, such as a nitrogen-vacancy cluster, is formed.

In particular, phenomena like spectral hole burning has been used to study diamonds with nitrogen-vacancy defects and nitrogen-vacancy clusters. The inventor has realized that burnt spectral holes in such diamonds may be successfully used in an atomic clock system, by generating a very sharp frequency-dependent response.

The inventor has further realized that a diamond must have specific properties, related in particular to the density of defects such as nitrogen-vacancy defects and nitrogen-vacancy clusters, in order to be used in applications such as atomic clocks, radiation detectors, electromagnetic vector sensors, solar blind photodetectors, cold cathodes, quantum information processors, or quantum memories. To obtain a diamond with specific properties related to the density of nitrogen-vacancy defects and nitrogen-vacancy clusters, the inventor has identified the need of a specific process of the diamond, and such need is addressed by the present disclosure.

The present disclosure relates to a method of processing a diamond to obtain vacancy-based defects and vacancy-based clusters, the method comprising the steps of:
providing a polished artificial single-crystal diamond, with root-mean-square surface roughness of less than 1 nm, with {001} faces, said artificial single-crystal diamond having a substitutional nitrogen concentration above or equal to 100 parts per million;
conditioning surfaces of the diamond by boiling under reflux of a solution comprising nitric, sulphuric, and an oxidizing acid, such as perchloric acid or hydrogen chloride;
irradiating the diamond with neutrons;
conditioning the surfaces of the diamond at a temperature above or at least 100° C., under a constant Ar flow with a pressure above or equal atmosphere pressure, such as at least 1 bar;
annealing the diamond,
thereby obtaining a diamond with vacancy-based defects and vacancy-based clusters. The vacancy-based defects may be any kind of vacancy-based defects, but in particular nitrogen-vacancy defects. The vacancy-based clusters may be any kind of vacancy-based clusters, but in particular nitrogen vacancy clusters.

The diamond may be provided in a state wherein its surfaces have been conditioned by boiling under reflux of a solution comprising nitric, sulphuric, and an oxidizing acid, such as perchloric acid or hydrogen chloride; and wherein the diamond has been irradiated with neutrons and/or electrons. In this case, the remaining steps of conditioning the surfaces of the diamond at a temperature above or at least 100° C., under a constant gas flow with a pressure above or equal atmosphere pressure, such as at least 1 bar, and annealing the diamond are performed. Preferably, the steps of conditioning the surfaces of the diamond at a temperature above or at least 100° C., under a constant gas flow with a pressure above or equal to atmosphere pressure and annealing the diamond are performed in a closed cell having a gas inlet: a gas outlet; and one or more getter items, which may be made of one or more transition metals, such as zirconium configured to absorb impurities released from cell walls of the closed cell and/or present in a gas in the closed cell and/or released from a diamond placed in the closed cell during the steps of conditioning the surfaces of the diamond at a temperature above or at least 100° C., under a constant gas flow with a pressure above or equal to atmosphere pressure and/or annealing the diamond. Preferably, the gas is helium, neon, argon, krypton, xenon or a combination thereof.

As a person skilled in the art may recognize, <001> indicates a set of equivalent crystallographic directions under the symmetry group of the crystal, namely [001], [010] and [100], whereas denotes a specific crystallographic direction and {001} denotes a set of planes, namely (001), (010), (100)

Artificial single-crystal diamonds with polished {001} faces and with a substitutional nitrogen concentration above or equal to 100 parts per million may be provided by a specialized laboratory. For many applications, such as atomic clock, radiation detectors, electromagnetic vector sensors, solar blind photodetectors, cold cathodes, quantum information processing, or quantum memories it is advantageous to begin with such a diamond and process it in order to obtain a specific density of vacancy-based defects, such as nitrogen-vacancy defects, and vacancy-based clusters, such as nitrogen-vacancy clusters.

By starting with a diamond with a substitutional nitrogen concentration above or equal to 100 parts per million, vacancies may be obtained by irradiation of the diamond with particles such as electrons or neutrons. Facilities that provide neutrons and/or neutron beams are for example, the European Spallation Source Centre (ESS), in Lund in Sweden, but other facilities may be used. The use of thermal neutrons is advantageous for the creation of vacancies in the diamond as neutrons are uncharged and kick-out carbon atoms from the crystalline structure of the diamond, creating vacancies without interacting.

For the irradiation to be successful and for a sufficient density of vacancies to be obtained in the diamond, it is important that the surface of the diamond is pristine, that is the surface of the diamond may not be covered by graphite, it may not be covered by organic material and may not have surface crystalline irregularities such as defects, pits, or scratches. In order to obtain a pristine surface the diamond is boiled under reflux of a solution comprising nitric, sulphuric, and an oxidizing acid, such as perchloric acid or hydrogen chloride. The purpose of the perchloric acid is to oxidize any organic compound. An alternative to perchloric acid is hydrogen chloride, but that is less efficient and requires longer boiling time. The synergistic combination of nitric and sulphuric acid etches the first monolayers of the surface of the diamond in an isotropic way, removing non-crystalline and crystal irregularities within the first nm of the surface surface such as defects, pits or scratches, micro cavities or scratches or other defects, such as crystallographic defects. In addition, boiling under reflux is also advantageous as it ensures that the surfaces of the diamond are contaminant-free, and predominantly consisting of $sp^3$ hybridised C atoms that are terminated via bridge-bonded ether group (C—O—C) as opposed to being substantially consistent of $sp^2$ hybridised C atoms and terminated with other atoms such as hydrogen (C—H) or functional groups such as hydroxy (C—OH), ketone (C=O), peroxide (C—O—O—C), or combinations thereof.

During the step of annealing the vacancies in the diamond, obtained by irradiation, migrate towards nitrogen forming nitrogen-vacancy defects and nitrogen-vacancy clusters. It is important, during annealing that the surfaces of the diamond are pristine, as the migration process is affected also by the condition of the surfaces and not only by the internal crystallographic structure of the diamond. Pristine, oxygen-terminated diamond [001] surfaces can be obtained after boiling under a triacid reflux, but, after irradiation or other steps, the surfaces of the diamond may be contaminated with oxygen or water or other contaminants. Therefore, prior to annealing a second conditioning of the surface under a flow of gas is carried out, to clean the surfaces from contaminants that may have accumulated.

The synergistic effect of the steps of the presently disclosed process yield a diamond with a density of nitrogen-vacancy defects and a density of nitrogen-vacancy clusters such that the processed diamond is suitable for being used in applications such as atomic clocks, radiation detectors, electromagnetic vector sensors, solar blind photodetectors, cold cathodes, quantum information processors, or quantum memories. The obtained density of nitrogen-vacancy defects in the diamond may be more than 10 parts per million, preferably more than 20 parts per million, more preferably 30 parts per million and may not exceed 100 parts per million. In addition, the density of nitrogen-vacancies clusters in the diamond may be between 1 and 7 parts per million, preferably 4 parts per million.

The present disclosure further relates to system for processing a diamond, comprising:
  a closed cell having a gas inlet; a gas outlet and one or more getter items configured to absorb impurities released from cell walls of the closed cell and/or present in a gas in the closed cell and/or released from a diamond placed in the closed cell;
  a device for proving a constant flow of gas through the gas inlet; and
  a cabinet or chamber for providing an annealing temperature between 800 and 950° C.

The present disclosure further relates to a diamond with nitrogen-vacancy defects and nitrogen-vacancy clusters processed according to the steps of the presently disclosed method.

The present disclosure further relates to a use of a diamond, processed according to the presently disclosed method, or use of the presently disclosed diamond in an atomic clock, radiation detectors, electromagnetic vector sensors, solar blind photodetectors, cold cathodes, quantum information processors, or quantum memories.

BRIEF DESCRIPTION OF THE DRAWINGS

Various embodiments are described hereinafter with reference to the drawings. The drawings are examples of embodiments and are intended to illustrate some of the features of the presently disclosed a method and system of processing a diamond, and are not limiting to the presently disclosed method and system.

DETAILED DESCRIPTION

Figure 1:
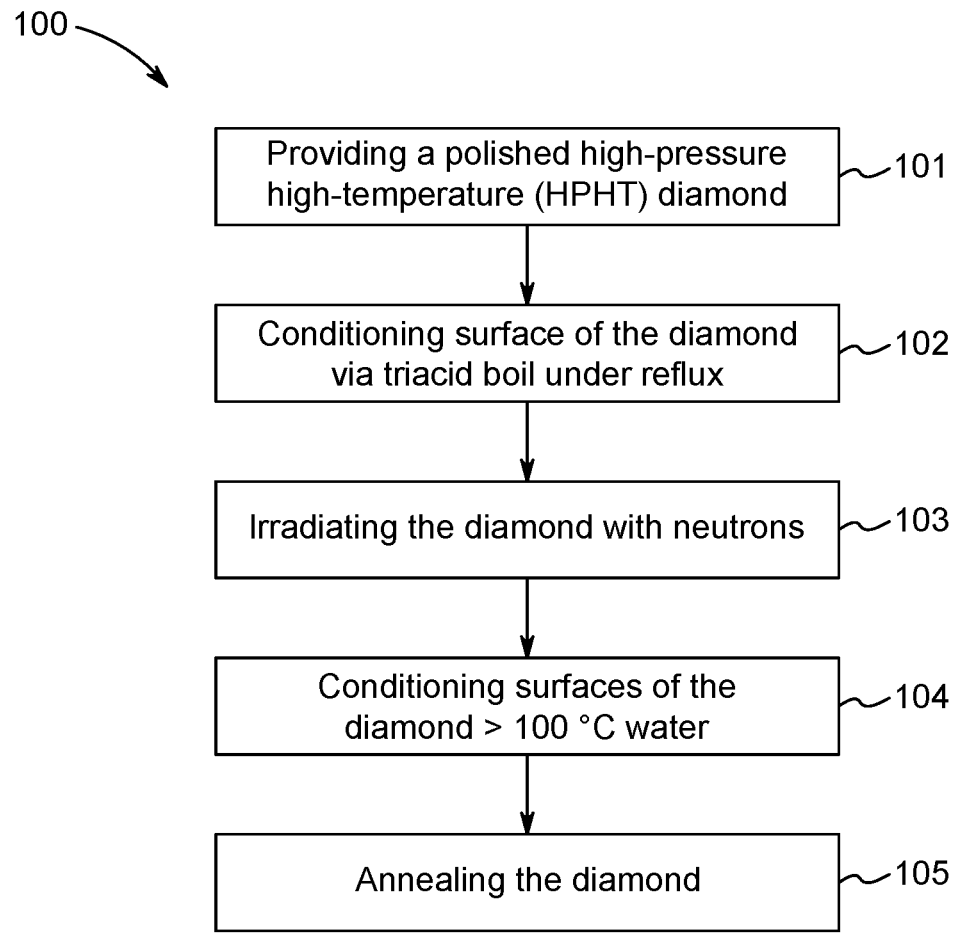
FIG. 1 shows a flow chart of one embodiment of the presently disclosed method.
Figure 2:
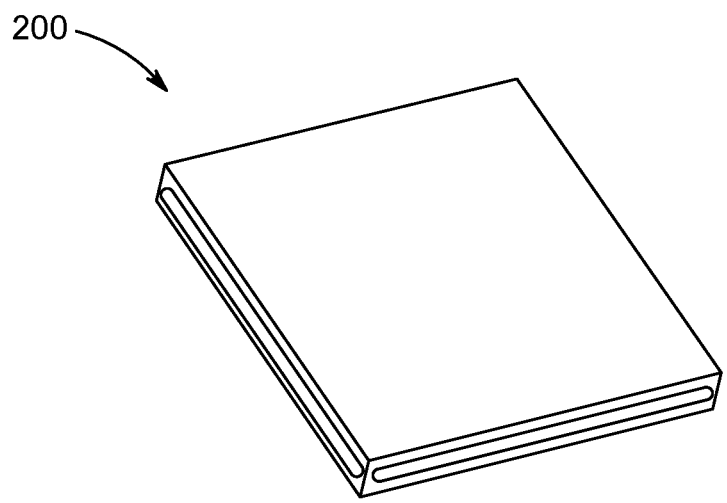
FIG. 2 shows a grown diamond with a substitutional nitrogen concentration that is larger than 100 parts per million.
Figure 3:
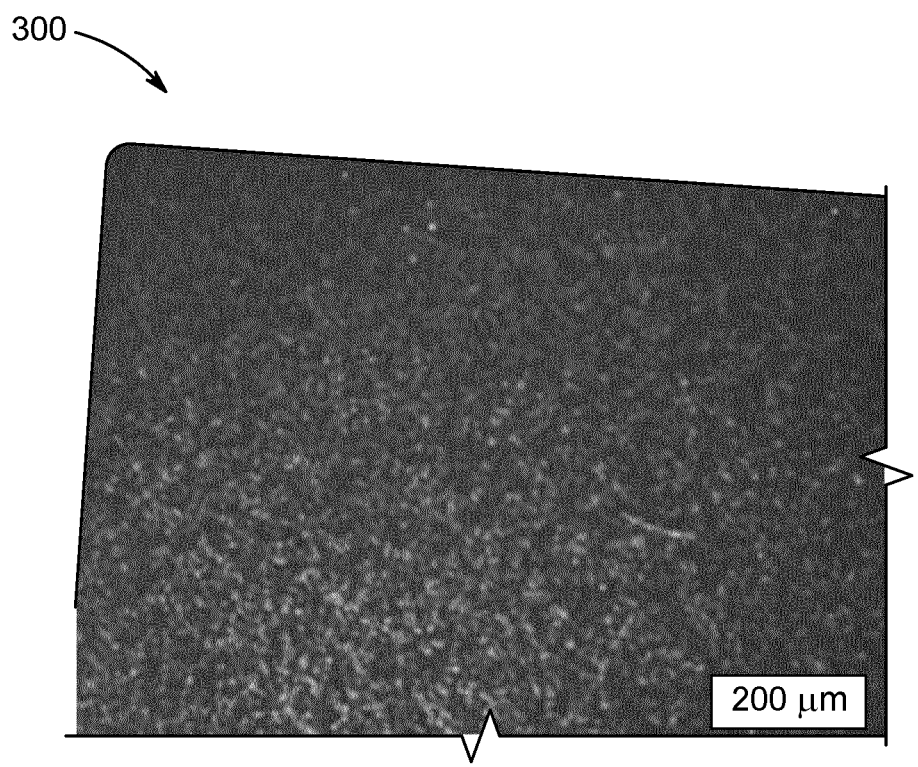
FIG. 3 shows an embodiment of a diamond after irradiating in the presently disclosed method.
Figure 4:
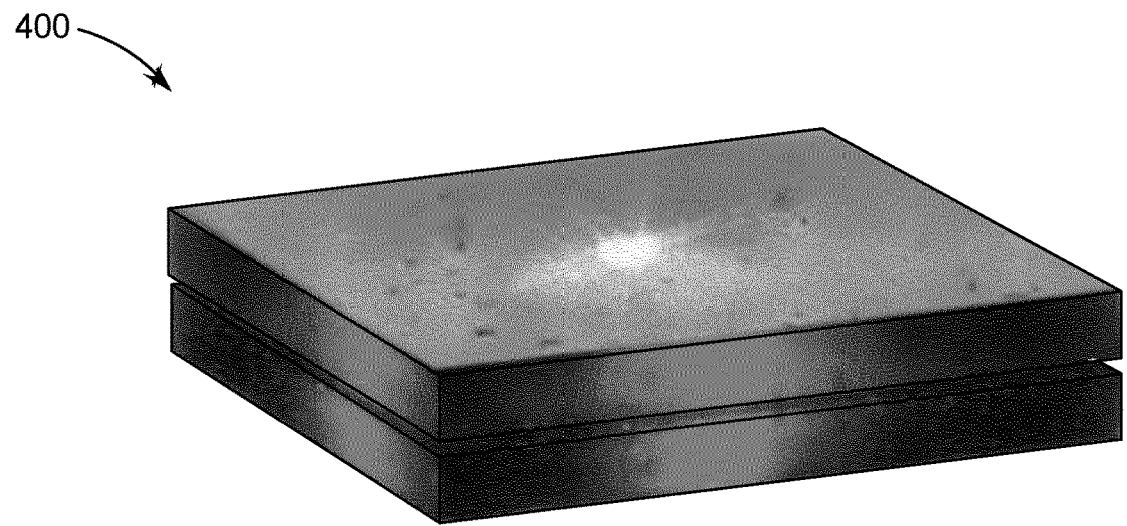
FIG. 4 shows an embodiment of a diamond after annealing in the presently disclosed method.
Figure 5:
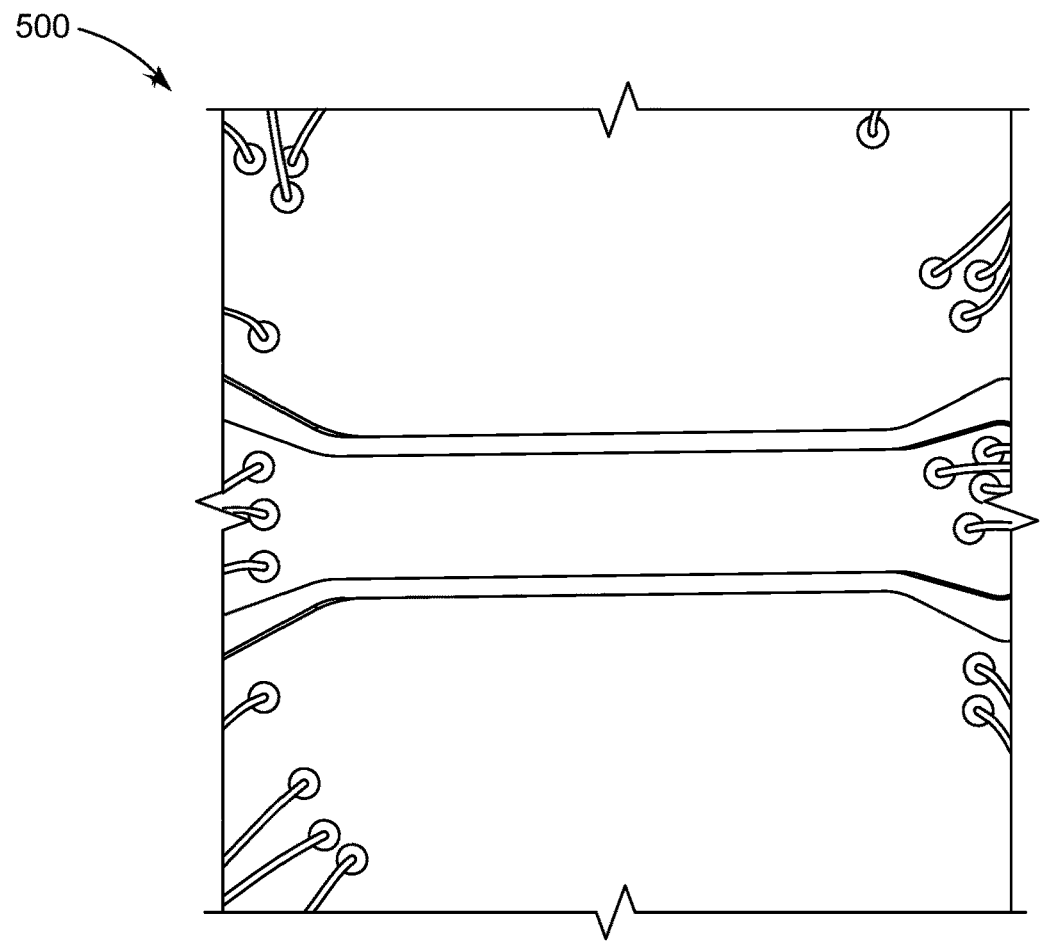
FIG. 5 shows an embodiment of a diamond after metallization in the presently disclosed method.
Figure 6:
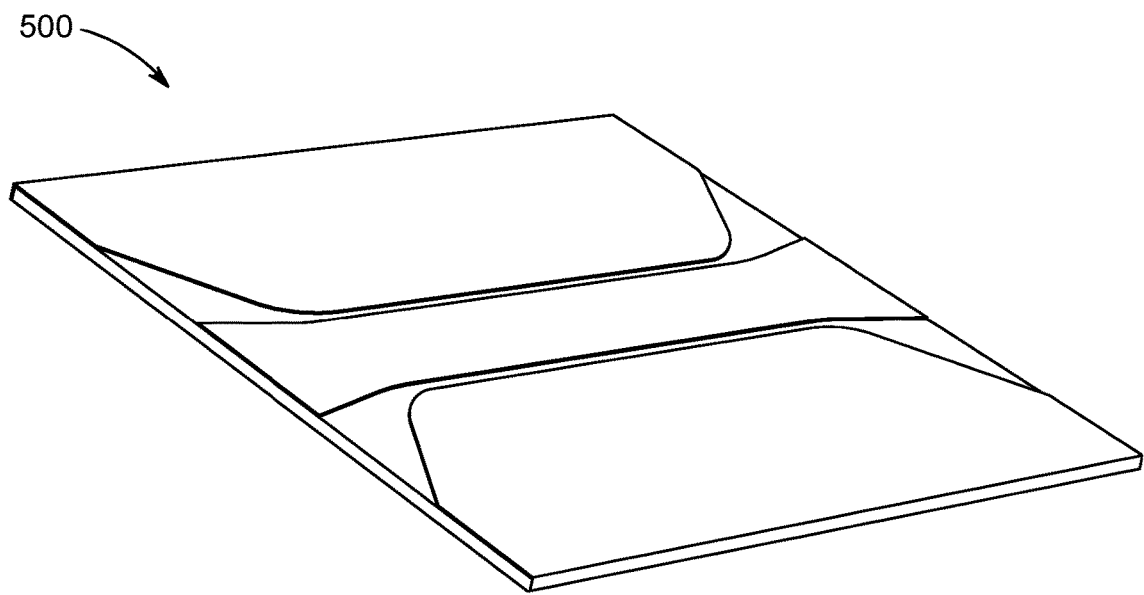
FIG. 6 shows an embodiment of a diamond after metallization in the presently disclosed method.

The present disclosure relates to a method of processing a diamond to obtain vacancy-based defects, such as nitrogen-vacancy defects, and vacancy-based clusters, such as nitrogen-vacancy clusters, the method comprising the steps of:
  providing an artificial single-crystal diamond with with root-mean-square surface roughness of less than 1 nm with {001} faces, said artificial single-crystal diamond having a substitutional nitrogen concentration above or equal to 100 parts per million;

conditioning surfaces of the diamond by boiling under reflux of a solution comprising of nitric, sulphuric, and an oxidizing acid, such as perchloric acid or hydrogen chloride;

irradiating the diamond with neutrons and/or electrons;

conditioning the surfaces of the diamond at a temperature above or at least 100° C., under a constant gas flow with a pressure above or equal to atmosphere pressure, such as at least 1 bar;

annealing the diamond, thereby obtaining a diamond with vacancy-based defects and vacancy-based clusters.

In one embodiment of the presently disclosed method, the steps may be sequential, in particular irradiation may be performed prior to annealing.

In one embodiment of the presently disclosure, the step of conditioning surfaces of the diamond by boiling under reflux, may be performed before annealing and after irradiating.

In one embodiment the steps of conditioning the surfaces of the diamond at a temperature above or at least 100° C., under a gas flow with a pressure above or equal to atmosphere pressure and annealing the diamond are performed in a closed cell having a gas inlet; a gas outlet; and one or more getter items configured to absorb impurities released from cell walls of the closed cell and/or present in a gas in the closed cell and/or released from a diamond placed in the closed cell during the steps of conditioning the surfaces of the diamond at a temperature above or at least 100° C., under a constant gas flow with a pressure above or equal to atmosphere pressure and/or annealing the diamond. The closed cell may be a quartz crucible. Specifically, the one or more getter items may be made of one or more transition metals, such as zirconium. The one or more getter items may take any suitable shape and size. For example, it may be useful to use a thin sheet, such as a sheet having a thickness of less than 3 mm, preferably less than 1 mm, and cut it into a number of small sheets. The small getter items in the form of sheets may be, for example, less than 100 mm². The small getter items in the form of sheets may be square-shaped sheets.

The present disclosure further relates to system for processing a diamond, comprising:

a closed cell having a gas inlet; a gas outlet and one or more getter items configured to absorb impurities released from cell walls of the closed cell and/or present in a gas in the closed cell and/or released from a diamond placed in the closed cell;

a device for proving a constant flow of gas through the gas inlet; and a cabinet or chamber for providing an annealing temperature between 800 and 950° C.

The system may be configured and used in any embodiment of the presently disclosed method of processing a diamond. It may thus comprise the aforementioned features related to the closed cell, i.e.: The closed cell may be a quartz crucible. Specifically, the one or more getter items may be made of one or more transition metals, such as zirconium. The one or more getter items may take any suitable shape and size. For example, it may be useful to use a thin sheet, such as a sheet having a thickness of less than 3 mm, preferably less than 1 mm, and cut it into a number of small sheets. The small getter items in the form of sheets may be, for example, less than 100 mm². The small getter items in the form of sheets may be square-shaped sheets.

The one or more getter items configured to absorb impurities released from cell walls of the closed cell and/or present in a gas in the closed cell and/or released from a diamond placed in the closed cell may be arranged in a part of the closed cell close to the gas inlet, such as closer than 50 mm to the gas inlet. Preferably, the one or more getter items are arranged between the gas inlet and the diamond.

The system may be configurable in a conditioning configuration wherein the surfaces of the diamond are conditioned at a temperature above or at least 100° C., under a constant gas flow with a pressure above or equal to atmosphere pressure, and in an annealing configuration wherein the diamond is annealed at an annealing temperature between 800 and 950° C.

The system may be configured and used in any embodiment of the presently disclosed method of processing a diamond. Accordingly, the system may comprise equipment for carrying out the steps of the method, such as a device or apparatus for boiling the diamond and/or a vacuum desiccator for drying the diamond and/or a system for irradiating the diamond with electrons and/or neutrons. A reflux apparatus with condenser may be used for the boiling. The system for irradiating the diamond with electrons and neutrons may comprise a particle source, such as a particle accelerator with a spallation target, an electron beam gun or a cathode ray.

Figure 7:
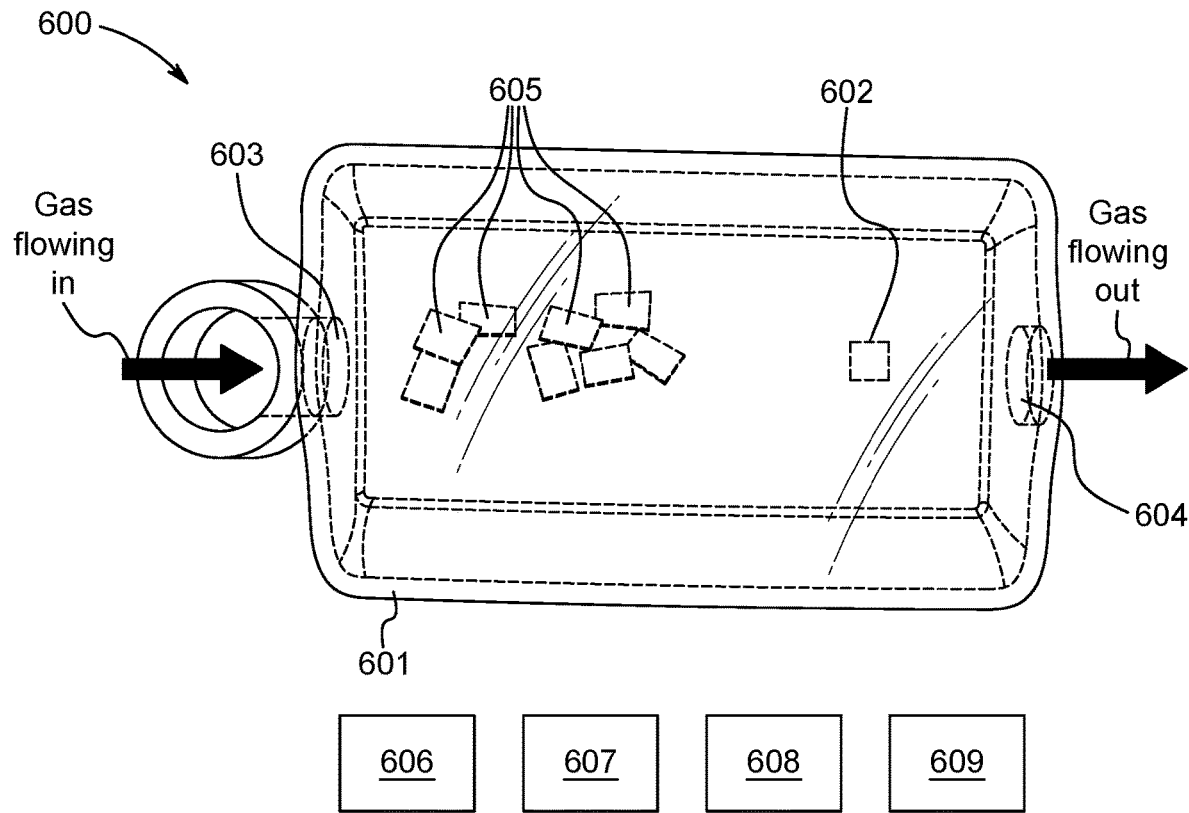
FIG. 7 shows an embodiment of a system for processing a diamond.

FIG. 7 shows an embodiment of a system 600 for processing a diamond 602. This example of a system 600 comprises a closed cell 601 in the form of a quartz crucible 601. The closed cell 601 has a gas inlet 603 and a gas outlet 604. A number of getter items 605 are disposed in the closed cell 601. The system 600 may further comprise a device 606 for boiling the diamond and/or a device 607 for rinsing the diamond with ionized water. The system may further comprise a vacuum desiccator 608 for drying the diamond and/or a system 609 for irradiating the diamond with electrons and/or neutrons.

Irradiation

In one embodiment of the presently disclosure, the step of irradiating with neutrons may be performed with fluence between $10^{19}$-$10^{20}$ neutrons/cm², such as $10^{19}$-$10^{20}$ thermal neutrons/cm. An optimum fluence of the neutrons is advantageous in order to obtain an optimum number of defects, and thermal energies as opposed to higher energies to avoid the increased chance of radionuclides and radioactivity In one embodiment of the present disclosure, the step of irradiating the diamond may be performed with the diamond placed in a quartz vial and surrounded with quartz wool.

Crucible

In one embodiment of the presently disclosure, the steps of conditioning the surfaces of the diamond and annealing the diamond may be performed in a crucible, such as a quartz tube crucible, provided with getter metal.

Getter Metal

In one embodiment of the presently disclosure, the getter metal comprises transition metal sheets or pieces dispersed in the vicinity of the diamond, said metal sheets or pieces having a thickness of less than 3 mm, preferably less than 2 mm, more preferably less than 1 mm. Getter metal is selected among materials with very good absorption of oxygen and oxygen-based gases under annealing temperature. Absorption of oxygen by the getter metal prevents reabsorption and graphitization of the diamond surfaces. The properties of the selected getter metal are advantageous because maintaining a pristine surface ensures optimal vacancy migration towards nitrogen atoms in the diamond. Selection of getter metal with good absorption of oxygen at the annealing temperatures is therefore advantageous for obtaining a yield, in terms of density of nitrogen-vacancy defects and nitrogen-vacancy clusters, useful for the applications of the present disclosure. The use of getter metal with good absorption of oxygen or oxygen-based gases is particularly advantageous also considering that the gas flow may contain impurities, such as oxygen molecules.

Annealing

In one embodiment of the present disclosure, the step of annealing the diamond may be performed at an annealing temperature between 800 and 950° C., preferably 890° C. The choice of the temperature is targeted to optimize the process of vacancy migration towards nitrogen atoms present in the diamond. The temperature needs to be high enough for the migration process to take place but also optimal, in combination with the getter metal properties of absorption of oxygen, in such a way that oxygen is absorbed by the getter metal and graphitisation of the diamond surfaces does not occur.

In one embodiment of the presently disclosure, the step of annealing the diamond may be performed at an annealing pressure between 1 and 3 bars of a flowing argon atmosphere. The choice of the pressure of the Argon atmosphere is optimal for the atomic integrity of the diamond surface, and thereby the migration dynamics of the vacancies generated in the diamond.

In one embodiment of the presently disclosure, the step of annealing the diamond may be performed for an annealing duration between 2-6 hours. The exact duration depends on the actual temperature used, on the thickness of the diamond and is optimised for the migration process of the vacancies towards the nitrogen atoms in the diamond.

In one embodiment of the presently disclosure, the step of annealing is performed with the diamond in a crucible.

First Conditioning

In one embodiment of the present disclosure, the step of conditioning the surfaces of the diamond by boiling is followed by the following steps: rinsing the diamond with deionized water; and drying the diamond in a vacuum desiccator at room temperature for at least 1 hour.

In one embodiment of the presently disclosure, the step of conditioning the surfaces of the diamond by boiling is performed at a temperature above a boiling temperature of the solution, preferably above 200° C., more preferably above 300° C. The temperature of this step has to be selected among temperatures above boiling temperature of the solution comprising nitric, sulphuric, and an oxidizing acid, such as perchloric acid or hydrogen chloride. In addition, the higher the temperature the more efficient and faster the step of conditioning the surface and rendering it pristine. However, the temperature may not exceed a maximum tolerable temperature of the used equipment.

Second Conditioning

In one embodiment of the presently disclosure, the step of conditioning the surfaces of the diamond under a constant gas flow is performed for a duration of at least 1 hour, preferably 2 hours, more preferably 3 hours. This second step of conditioning surfaces, performed in a crucible, is advantageous as it eliminates, from surfaces of the diamond, water or other detriments accumulated during the previous steps, such as in irradiating, or when exposing the crucible to the atmosphere, in order to obtain pristine surfaces of the diamond. The step of irradiating is performed in a quartz vial, whereas the diamond is placed in a crucible for annealing. During insertion of the diamond in the crucible such as a quartz tube crucible, the crucible and the diamond may be exposed to open atmosphere and therefore may be contaminated.

Gradual Ramp Up

In one embodiment of the presently disclosure, the step of annealing is preceded by a step of applying a gradual linear temperature ramp-up before annealing the diamond. In order to reach annealing temperature, a gradual temperature ramp-up is needed to anneal out various interstitial-type defects and complexes while maintaining generated vacancies, while an abrupt temperature increase may have detrimental effects on the migration of the vacancies towards nitrogen defects and the total nitrogen-vacancy generation yield.

In one embodiment of the presently disclosure, the gradual linear temperature ramp-up has a minimum duration of 5 hours.

In one embodiment of the presently disclosure, the gradual linear temperature ramp-up is applied, in a crucible containing the diamond, under gas flow at the pressure above atmosphere pressure, such as at least 1.01 bar. The pressure of the gas may be at least above normal atmospheric temperature to avoid contaminants from the atmosphere to reach inside the crucible.

In one embodiment of the presently disclosure, the temperature ramp-up brings the diamond from a base temperature comprised between 50° C. and 150° C. preferably 100° C., to an annealing temperature comprised between 800° C. and 950° C., preferably 890° C.

Gradual Ramp Down

One embodiment of the presently disclosed method may further comprise the step of applying a gradual linear temperature ramp-down after annealing the diamond.

In one embodiment of the presently disclosure, the gradual linear temperature ramp-down has a duration of at least 6 hours.

In one embodiment of the presently disclosure, the gradual linear temperature ramp-down brings the diamond from an annealing temperature, between 800° C. and 950° C., preferably 890° C., to a base temperature between 50° C. and 150° C., preferably 100° C.

In one embodiment of the presently disclosure, the gradual linear temperature ramp-down is performed, in a crucible containing the diamond, under gas flow at the pressure above atmosphere pressure, such as at least 1.01 bar.

The gradual ramp-down in temperature contributes to a better yield of the presently disclosed method as an abrupt change in temperature may compromise the migration process of the vacancies towards the nitrogen atoms in the diamond, as well as the removal of interstitial-type carbon and nitrogen defects.

Resting to Room Temperature

One embodiment of the presently disclosed method may further comprise the step of turning off the heat in a crucible containing the diamond and let the diamond rest to reach room temperature from a base temperature, to avoid the adsorption of atmospheric gases and contaminants onto the surface of the diamond and generating a non-pristine layer that is detrimental to the electronic properties of the generated nitrogen-vacancy defects.

In one embodiment of the presently disclosure, the diamond is resting with heat turned-off under gas pressure above atmosphere pressure, such as at least 1.01 bar.

Conversion Efficiency

In one embodiment of the presently disclosure, a conversion efficiency of nitrogen defects to nitrogen-vacancy defects is substantially 5%-20%.

In one embodiment of the presently disclosure, a conversion efficiency of nitrogen defects to nitrogen-vacancies clusters is substantially 0.5%-5%.

Metallization

One embodiment of the present disclosure further comprise an optional step of metallization of at least a surface of the diamond, the metallization carried out via lithography-based sputter and electroplated deposition of at least one layer of metal.

In one embodiment of the presently disclosure, the at least one layer of metal comprises a first layer of Ti and a second layer of Au.

In one embodiment of the presently disclosure, the first layer of Ti is substantially 2-10 nm thick, and the second layer of Au is substantially 0.5-2 micrometers thick.

In one embodiment of the presently disclosure, the metallization is etched to obtain at least two interdigitated electrodes to detect photocurrents on a surface of the diamond.

In one embodiment of the presently disclosure, the metallization is etched to obtain radiofrequency and microwave transmission lines on a surface parallel to crystal surface with the interdigitated electrodes.

The inventor has realized that, when illuminating the diamond with laser diodes, such as green laser diodes, in combination with microwave excitation, the diamond emits fluorescence light which may be detected by use of, for example a photodiode. The inventor has realized that, instead of detecting fluorescence, it is possible to detect photocurrents on one of the surfaces of the diamond by use of interdigitated electrodes. That is advantageous when the diamond is used in an atomic clock. For the same application, when the diamond is used in an atomic clock, it is advantageous to have a coplanar waveguide just at one surface of the diamond, as that may be used to transmit an electromagnetic excitation signal to the diamond.

Diamond With NV Defects and NV Clusters

The present disclosure further relates to a diamond with nitrogen-vacancy defects and nitrogen-vacancy clusters, for use in an atomic clock, radiation detectors, electromagnetic vector sensors, solar blind photodetectors, cold cathodes, quantum information processors, or quantum memories the diamond processed according to the presently disclosed method.

One embodiment of the presently disclosed diamond, may have a density of nitrogen-vacancy defects in the diamond more than 10 parts per million, preferably more than 20 parts per million, more preferably 30 parts per million and does not exceed 100 parts per million.

One embodiment of the presently disclosed diamond, may have a density of nitrogen-vacancies clusters is between 1 and 7 parts per million, preferably 4 parts per million.

In one embodiment of the presently disclosure the nitrogen-vacancy clusters may comprise types of, but not limited to: B, H2 H3, H4, N3, W16-W18, W24, W33 or P2 or combination thereof.

Use of the Diamond Processed According to the Method

The present disclosure further relates to a use of a diamond, processed according to the presently disclosed method, or use of a presently disclosed diamond, in an atomic clock, radiation detectors, electromagnetic vector sensors, solar blind photodetectors, cold cathodes, quantum information processors, or quantum memories.

Further Details

1. A method of processing a diamond to obtain nitrogen-vacancy defects and nitrogen-vacancy clusters, the method comprising the steps of:
   providing a polished artificial single-crystal diamond, with root-mean-square surface roughness of less than 1 nm with {001} faces, said artificial single-crystal diamond having a substitutional nitrogen concentration above or equal to 100 parts per million, wherein the diamond has been conditioned by conditioning surfaces of the diamond by boiling under reflux of a solution comprising nitric, sulphuric, and an oxidizing acid, such as perchloric acid or hydrogen chloride; and wherein the diamond has been irradiated with neutrons and/or electrons;
   conditioning the surfaces of the diamond at a temperature above or at least 100° C., under a constant gas flow with a pressure above or equal to atmosphere pressure, such as at least 1 bar;
   annealing the diamond,
   thereby obtaining a diamond with nitrogen-vacancy defects and nitrogen-vacancy clusters.
2. A method of processing a diamond to obtain nitrogen-vacancy defects and nitrogen-vacancy clusters, the method comprising the steps of:
   providing a polished artificial single-crystal diamond, with root-mean-square surface roughness of less then 1 nm with {001} faces, said artificial single-crystal diamond having a substitutional nitrogen concentration above or equal to 100 parts per million;
   conditioning surfaces of the diamond by boiling under reflux of a solution comprising nitric, sulphuric, and an oxidizing acid, such as perchloric acid or hydrogen chloride;
   irradiating the diamond with neutrons;
   conditioning the surfaces of the diamond at a temperature above or at least 100° C., under a constant argon (Ar) flow with a pressure above or equal to atmosphere pressure, such as at least 1 bar;
   annealing the diamond,
   thereby obtaining a diamond with nitrogen-vacancy defects and nitrogen-vacancy clusters.
3. The method according to any one of the preceding items, wherein the steps are sequential.
4. The method according to any one of the preceding items, wherein the step of irradiating with neutrons is performed with a fluence between $10^{19}$-$10^{20}$ neutrons/$cm^2$, such as between $10^{19}$-$10^{20}$ thermal neutrons/$cm^2$.
5. The method according to any one of the preceding items, wherein the steps of conditioning the surfaces of the diamond and annealing the diamond are performed in a crucible, such as a quartz tube crucible, provided with getter metal.
6. The method according to item 5, wherein the getter metal comprises transition metal pieces dispersed in the vicinity of the diamond, said metal pieces having a thickness of less than 3 mm, preferably less than 2 mm, more preferably less than 1 mm.
7. The method according to any one of the preceding items, wherein the step of annealing the diamond is performed at an annealing temperature between 800 and 950° C., preferably 890° C.
8. The method according to any one of the preceding items, wherein the step of annealing the diamond is performed at an annealing pressure between 1 and 3 bars of Argon atmosphere.
9. The method according to any one of the preceding items, wherein the step of annealing the diamond is performed for an annealing duration between 2-6 hours.

10. The method according to any one of the preceding items, wherein the step of annealing is performed with the diamond in a crucible.
11. The method according to any one of the preceding items, wherein the step of conditioning the surfaces of the diamond under a constant Ar flow is performed for a duration of at least 1 hour, preferably 2 hours, more preferably 3 hours.
12. The method according to any one of the preceding items, wherein the step of conditioning the surfaces of the diamond by boiling is followed by the following steps: rinsing the diamond with deionized water; and drying the diamond in a vacuum desiccator at room temperature.
13. The method according to any one of the preceding items, wherein the step of conditioning the surfaces of the diamond by boiling is performed at a temperature above a boiling temperature of the solution, preferably above 200° C., more preferably above 300° C.
14. The method according to item 12, wherein drying in a vacuum dessicator is performed for at least 1 hour.
15. The method according to any one of the preceding items, further comprising the step of applying a gradual linear temperature ramp-up before annealing the diamond.
16. The method according to item 15, wherein the gradual linear temperature ramp-up has a minimum duration of 5 hours.
17. The method according to items 15 and 16, wherein the gradual linear temperature ramp-up is applied, in a crucible containing the diamond, under Ar flow at the pressure above atmosphere pressure, such as at least 1.01 bar.
18. The method according to items 15-17, wherein the temperature ramp-up brings the diamond from a base temperature comprised between 50° C. and 150° C., preferably 100° C., to an annealing temperature comprised between 800° C. and 950° C., preferably 890° C.
19. The method according to any one of the preceding items, further comprising the step of applying a gradual linear temperature ramp-down after annealing the diamond.
20. The method according to item 19, wherein the gradual linear temperature ramp-down has a duration of at least 6 hours.
21. The method according to items 19 and 20, wherein the gradual linear temperature ramp-down brings the diamond from an annealing temperature, between 800° C. and 950° C., preferably 890° C., to a base temperature between 50° C. and 150° C., preferably 100° C.
22. The method according to items 19-21, wherein the gradual linear temperature ramp-down is performed, in a crucible containing the diamond, under Ar flow at the pressure above atmosphere pressure, such as at least 1.01 bar.
23. The method according to any one of the preceding items, further comprising the step of turning off the heat in a crucible containing the diamond and let the diamond rest to reach room temperature from a base temperature.
24. The method according to item 23, wherein the diamond is resting with heat turned-off under Ar pressure above atmosphere pressure, such as at least 1.01 bar.
25. The method according to any one of the preceding items, wherein the step of irradiating the diamond is performed with the diamond placed in a quartz vial, and surrounded with quartz wool.
26. The method according to any one of the preceding items, wherein a conversion efficiency of nitrogen defects to nitrogen-vacancy defects is substantially 5%-20%.
27. The method according to any one of the preceding items, wherein a conversion efficiency of nitrogen defects to nitrogen-vacancies clusters is substantially 0.5%-5%.
28. The method according to any one of the preceding items, further comprising the step of metallization of at least a surface of the diamond, the metallization carried out via lithography-based sputter and electroplated deposition of at least one layer of metal.
29. The method according to item 28, wherein the at least one layer of metal comprises a first layer of Ti and a second layer of Au.
30. The method according to item 29, wherein the first layer of Ti is substantially 2-10 nm thick, and the second layer of Au is substantially 0.5-2 micrometers thick.
31. The method according to item 28, wherein the metallization is etched to obtain at least two interdigitated electrodes to detect photocurrents on a surface of the diamond.
32. The method according to item 31, wherein the metallization is etched to obtain radiofrequency and microwave transmission lines on a surface parallel to crystal surface with the interdigitated electrodes
33. A diamond with nitrogen-vacancy defects and nitrogen-vacancy clusters, for use in an atomic clock, radiation detectors, electromagnetic vector sensors, solar blind photodetectors, cold cathodes, quantum information processors, or quantum memories, the diamond processed according to the method of any one of items 2-32.
34. The diamond according to item 33, wherein a density of nitrogen-vacancy defects in the diamond is more than 10 parts per million, preferably more than 20 parts per million, more preferably 30 parts per million and does not exceed 100 parts per million.
35. The diamond according to any one of items 33-34, wherein a density of nitrogen-vacancies clusters is between 1 and 7 parts per million, preferably 4 parts per million.
36. The diamond according to any one of items 33-35, wherein the nitrogen-vacancy clusters comprise types of: B, H2 H3, H4, N3, W16-W18, W24, W33 or P2 or combination thereof.
37. Use of a diamond, processed according to the method of any one of items 2-32, or use of a diamond according to any one of items 33-36, in an atomic clock, radiation detectors, electromagnetic vector sensors, solar blind photodetectors, cold cathodes, quantum information processors, or quantum memories.

The invention claimed is:
1. A method of processing a diamond to obtain vacancy-based defects and vacancy-based clusters, the method comprising the steps of:
providing a polished artificial single-crystal diamond, with root-mean-square surface roughness of less than 1 nm with {001} faces, said artificial single-crystal diamond having a substitutional nitrogen concentration above or equal to 100 parts per million;
conditioning, in a first conditioning step, surfaces of the diamond by boiling under reflux of a solution comprising nitric, sulphuric, and an oxidizing acid;

irradiating the diamond with neutrons and/or electrons;
conditioning, in a second conditioning step, the surfaces of the diamond at a temperature above or at least 100° C., under a constant gas flow with a pressure above or equal to atmosphere pressure;
annealing the diamond,
thereby obtaining a diamond with vacancy-based defects and vacancy-based clusters,
wherein the second conditioning step of conditioning the surfaces of the diamond at a temperature above or at least 100° C., under a constant gas flow with a pressure above or equal to atmosphere pressure and annealing the diamond is performed in a closed cell having a gas inlet; a gas outlet; and one or more getter items configured to absorb impurities released from cell walls of the closed cell and/or present in a gas in the closed cell and/or released from a diamond placed in the closed cell during the second conditioning step of conditioning the surfaces of the diamond at a temperature above or at least 100° C., under a constant gas flow with a pressure above or equal to atmosphere pressure and/or annealing the diamond.

2. The method according to claim 1, wherein the steps are sequential.

3. The method according to claim 1, wherein the gas is helium, neon, argon, krypton, xenon or a combination thereof.

4. The method according to claim 1, wherein the one or more getter items are made of one or more transition metals.

5. The method according to claim 1, wherein the one or more getter items are sheets.

6. The method according to claim 5, wherein the sheets have a thickness of less than 3 mm.

7. The method according to claim 1, wherein the closed cell is a quartz crucible.

8. The method according to claim 1, wherein the step of irradiating with neutrons is performed with a fluence between $10^{19}$-$10^{20}$ neutrons/cm$^2$.

9. The method according to claim 1, wherein the second conditioning step of conditioning the surfaces of the diamond and the step of annealing the diamond are performed in a crucible, provided with getter metal.

10. The method according to claim 1, wherein the step of annealing the diamond is performed at an annealing temperature between 80° and 950° C.

11. The method according to claim 1, wherein the step of annealing the diamond is performed for an annealing duration between 2-6 hours.

12. The method according to claim 1, further comprising the step of applying a gradual linear temperature ramp-up before annealing the diamond.

13. The method according to claim 12, wherein the temperature ramp-up brings the diamond from a base temperature comprised between 50° C. and 150° C., to an annealing temperature comprised between 800° C. and 950° C.

14. The method according to claim 1, further comprising the step of applying a gradual linear temperature ramp-down after annealing the diamond.

15. The method according to claim 14, wherein the gradual linear temperature ramp-down has a duration of at least 6 hours.

16. The method according to claim 15, wherein the gradual linear temperature ramp-down brings the diamond from an annealing temperature, between 800° C. and 950° C., to a base temperature between 50° C. and 150° C.

17. The method according to claim 1, further comprising the step of metallization of at least a surface of the diamond, the metallization carried out via lithography-based sputter and electroplated deposition of at least one layer of metal.

18. The method according to claim 17, wherein the metallization is etched to obtain at least two interdigitated electrodes to detect photocurrents on a surface of the diamond.

19. A system for processing a diamond, comprising:
a boiling device for boiling the diamond;
an irradiation system for irradiating the diamond with electrons and/or neutrons;
a closed cell having a gas inlet; a gas outlet and one or more getter items configured to absorb impurities released from cell walls of the closed cell and/or present in a gas in the closed cell and/or released from a diamond placed in the closed cell;
a device for proving a constant flow of gas through the gas inlet;
a cabinet or chamber for providing an annealing temperature between 80° and 950° C.;
wherein the system is configured to carry out the method according to claim 1.

20. The system according to claim 19, wherein the system is configurable in a conditioning configuration wherein the surfaces of the diamond are conditioned at a temperature above or at least 100° C., under a constant gas flow with a pressure above or equal to atmosphere pressure, and in an annealing configuration wherein the diamond is annealed at an annealing temperature between 80° and 950° C.

21. A method of processing a diamond to obtain vacancy-based defects and vacancy-based clusters, the method comprising the steps of:
providing a polished artificial single-crystal diamond, with root-mean-square surface roughness of less than 1 nm with {001} faces, said artificial single-crystal diamond having a substitutional nitrogen concentration above or equal to 100 parts per million, wherein the surfaces of the diamond have been conditioned, in a first conditioning step, by boiling under reflux of a solution comprising nitric, sulphuric, and an oxidizing acid;
irradiating the diamond with neutrons and/or electrons;
conditioning, in a second conditioning step, the surfaces of the diamond at a temperature above or at least 100° C., under a constant gas flow with a pressure above or equal to atmosphere pressure;
annealing the diamond,
thereby obtaining a diamond with vacancy-based defects and vacancy-based clusters,
wherein the second step of conditioning the surfaces of the diamond at a temperature above or at least 100° C., under a constant gas flow with a pressure above or equal to atmosphere pressure and annealing the diamond is performed in a closed cell having a gas inlet; a gas outlet; and one or more getter items configured to absorb impurities released from cell walls of the closed cell and/or present in a gas in the closed cell and/or released from a diamond placed in the closed cell during the second conditioning step of conditioning the surfaces of the diamond at a temperature above or at least 100° C., under a constant gas flow with a pressure above or equal to atmosphere pressure and/or annealing the diamond.

* * * * *